United States Patent
Ward et al.

(10) Patent No.: US 6,193,278 B1
(45) Date of Patent: Feb. 27, 2001

(54) SPLASH GUARD AND METHOD OF MAKING

(76) Inventors: Douglas K. Ward, 9 Scenic Millway, Toronto, Ontario (CA), M2L 1S4; Kenneth J. Lott, 72 Pinebrook Crescont, Whitby Ontario (CA), L1R 2J7

(*) Notice: Subject to any disclaimer, the term of this patent is extended or adjusted under 35 U.S.C. 154(b) by 0 days.

(21) Appl. No.: 09/291,225

(22) Filed: Apr. 13, 1999

(51) Int. Cl.[7] .................................................. B62D 25/00
(52) U.S. Cl. .......................................... 280/848; 280/851
(58) Field of Search ..................................... 280/847, 848, 280/849, 851, 152.1, 152.3, 154

(56) References Cited

U.S. PATENT DOCUMENTS

| | | |
|---|---|---|
| 3,953,053 | 4/1976 | Arenhold . |
| 4,268,052 | 5/1981 | Sullivan . |
| 4,315,634 | 2/1982 | Arenhold . |
| 4,323,262 | 4/1982 | Arenhold . |
| 4,524,986 | 6/1985 | Ward . |
| 4,629,204 | 12/1986 | Arenhold . |
| 4,709,938 | 12/1987 | Ward et al. . |
| 4,877,268 | 10/1989 | Price . |
| 4,927,177 | 5/1990 | Price . |
| 5,048,868 | 9/1991 | Arenhold . |
| 5,120,082 | 6/1992 | Ito . |
| 5,407,229 | 4/1995 | Garrett . |
| 5,722,690 | 3/1998 | Ward et al. . |

OTHER PUBLICATIONS

Mopar Accessories' "Molded Splash Guard Installation Instructions" for P/N 82401047 & 82401047, Mar., 1995.
Altec Products Inc.'s "Products Designed to Protect Enhance & Complement" brochure.

*Primary Examiner*—Richard M. Camby
(74) *Attorney, Agent, or Firm*—Watts, Hoffman, Fisher & Heinke Co LPA

(57) ABSTRACT

An automotive vehicle splash guard is disclosed. The splash guard includes a generally flat and flexible mounting component contoured to be mounted in a wheel well of any vehicle of a class of vehicles and a contoured member shaped to provide body panel engagement with at least one selected vehicle but not all vehicles of the class. The member and the component have engaging portions which are contoured complementally such that when the member and the component are secured together the member and the component together give the appearance of a unitary splash guard custom molded to fit such at least one selected vehicle of the class. A process for making customized splash guards is also disclosed.

13 Claims, 2 Drawing Sheets

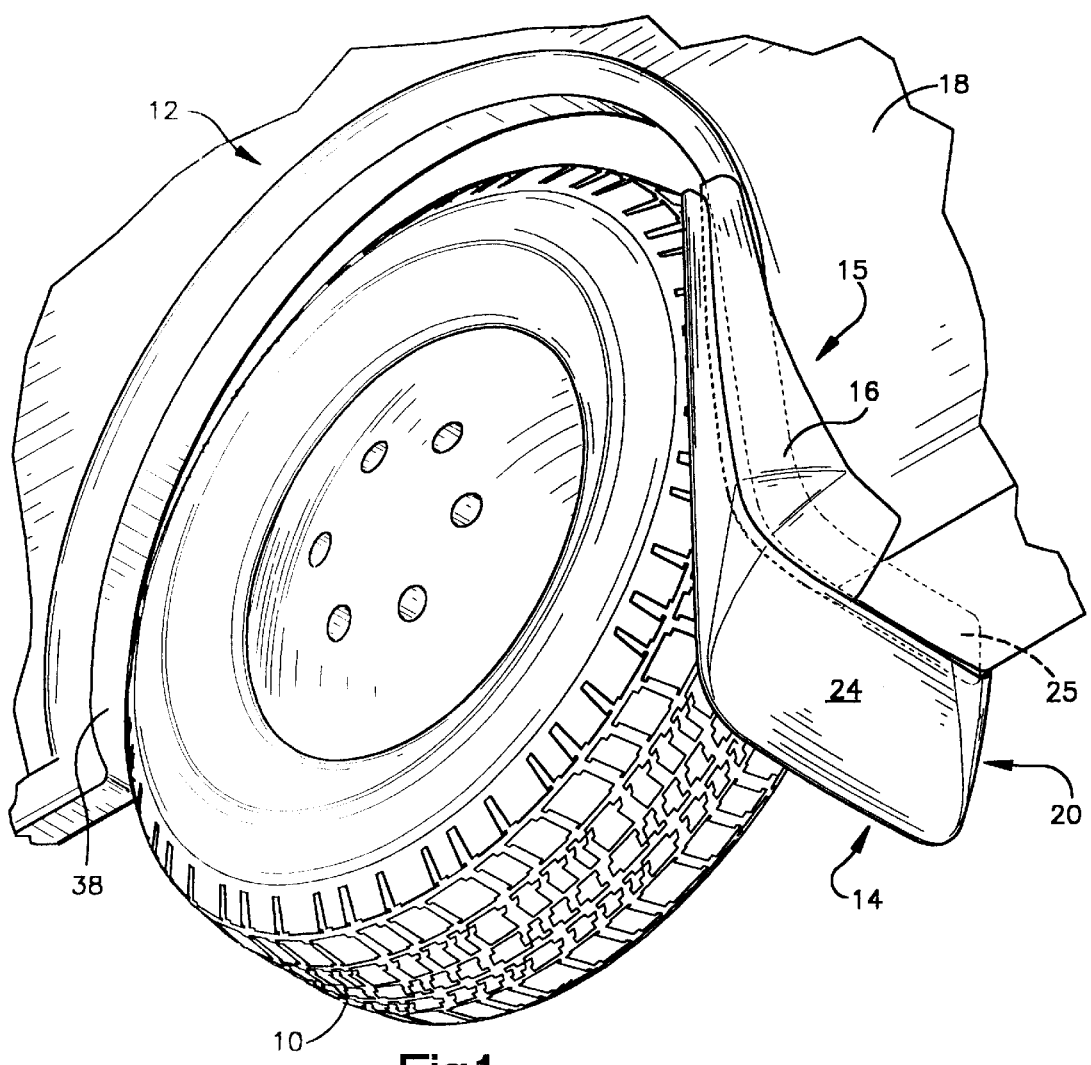
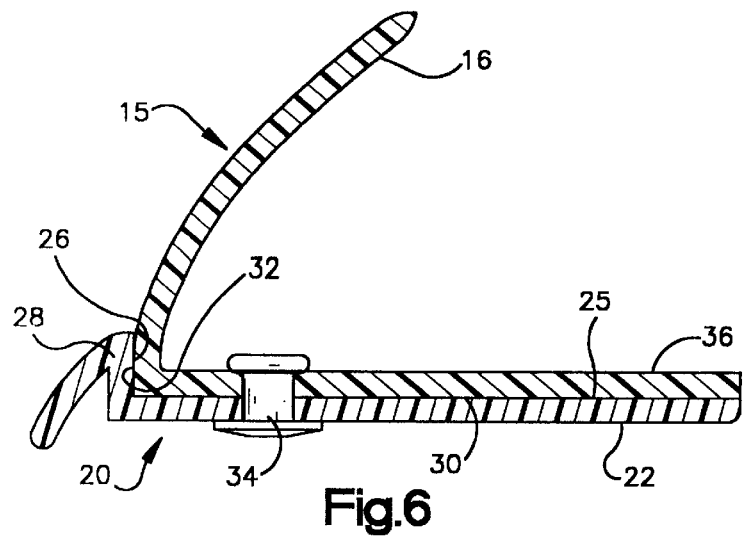

SPLASH GUARD AND METHOD OF MAKING

This invention relates to automotive splash guards and more particularly to splash guards and a method of making them. Such a splash guard may be (a) a custom splash guard designed to precisely fit a specific vehicle or family of vehicles or, alternately (b) a splash guard which will fit a number of different automobiles forming a set having similar configurations with the fit being in a manner which gives the appearance of a custom molded splash guard designed to fit any automobile of the set.

BACKGROUND OF THE INVENTION

For a number of years, some automotive manufactures have provided custom molded splash guards for vehicles of their manufacture. Some manufacturers provide them as standard equipment to be attached to vehicles by a dealer or customer at or subsequent to the time of purchase. Other manufacturers make custom molded splash guards available as an optional accessory or after market product.

U.S. Pat. No. 4,709,938 issued Dec. 1, 1987 to Douglas K. Ward et al. entitled Splash Guard (the '938 patent) discloses splash guards each of which was adapted to fit a number of vehicles of a set while giving the appearance of being a custom molded splash guard. The ability of a splash guard to appear to be custom molded for a number of vehicles of similar but differing contours was accomplished through the provision of a flexible flange which overlaid and engaged the face of a panel adjacent to a wheel well.

By the mid 90's a problem had developed, in that many models had projections which interfered with the flanges of the splash guards made in accordance with the '938 patent. On Mar. 3, 1998 U.S. Pat. No. 5,722,690 was issued to Douglas K. Ward et al. under the title Splash Guard on an improvement over the '938 patent. The improvement utilized a flange which included a deformable pleated section allowing further flange deformation to accommodate such projections as welded together flanges, relatively large swoop and cladings. While the splash guards of the Ward et al. patents have enjoyed significant commercial success as have custom molded splash guards designed to fit specific vehicles, the cost of development and manufacture remains relatively high capital costs are high because of the need to develop and produce relatively complex and expensive molds. Manufacturing costs are high if frequent mold changes are required because a splash guard manufacturer's volume does not justify essentially full time utilization of a given mold.

Accordingly, it would be desirable to provide low cost custom molded splash guards and splash guards which give the appearance of being custom molded. It would also be desirable to provide a simplified splash guard and a process of making splash guards which would enable the inexpensive development, tooling and manufacture of a greater variety of custom molded splash guards and splash guards which, at a minimum of inventory expense and complexity, can be color matched with the vehicles on which they are to be mounted.

SUMMARY OF THE INVENTION

With a splash guard of the present invention, standard mounting portions are provided. These mounting portions are relatively flat, flexible members which are adapted to be fit within fender wells of a wide variety of vehicles. Relatively small flange engaging members of a range of contours are provided. The flange engaging members may be custom molded to a variety of contours each to fit a specific and associated vehicle of a group of vehicles.

Each of the flange engaging members has a standardized mounting portion, such that while portions of the members are custom molded to fit specific vehicles, the mounting portions are identical to one another. The standard components include mounting portions which are configured to complementally fit the mounting portions of the custom molded members to locate the member and the component relatively and, once connected together, give the appearance of a unitary custom molded splash guard.

The custom molded members may be molded of pigmented material to match the color of a vehicle on which such custom molded member is to be mounted. Alternatively and preferably, at least for the after market, the custom molded members are made of a material which will accept and retain a finish coating to match the color of a vehicle to which it is to be mounted.

Where splash guards of the present invention are manufactured to be sold to an automobile manufacture, normally each custom molded member will be fixed to one of the standard mounting components. For the after market, the components and members will normally not be fixed together to allow the purchasers to color match the contoured body flange engaging member to the color of the body flange it is to engage and thereafter secure the colored contoured member and a standard component together as they are mounted on the vehicle.

Whether secured together by the splash guard manufacturer or a purchaser, the finished splash guard gives the appearance of being a unitary custom molded splash guard. Costs of development of the novel splash guard are greatly reduced because one need only develop a small contoured molded member. Since a set of small and simple molds for the custom molded members enables production of as many different splash guards as there are molds in a set, there is a substantial cost saving in tooling. There is a saving because with prior custom molded splash guards and splash guards made in accordance with the Ward et al patents each mold was far larger and more complex to produce complete unitary splash guards.

Accordingly, the objects of the invention are to provided novel and improved splash guards and a method of producing such novel and improved splash guards.

BRIEF DESCRIPTION OF THE DRAWINGS

FIG. 1 is a fragmentary perspective view showing a wheel well and a wheel of a vehicle equipped with a splash guard of the present invention;

DESCRIPTION OF THE PREFERRED EMBODIMENT

Figure 2:
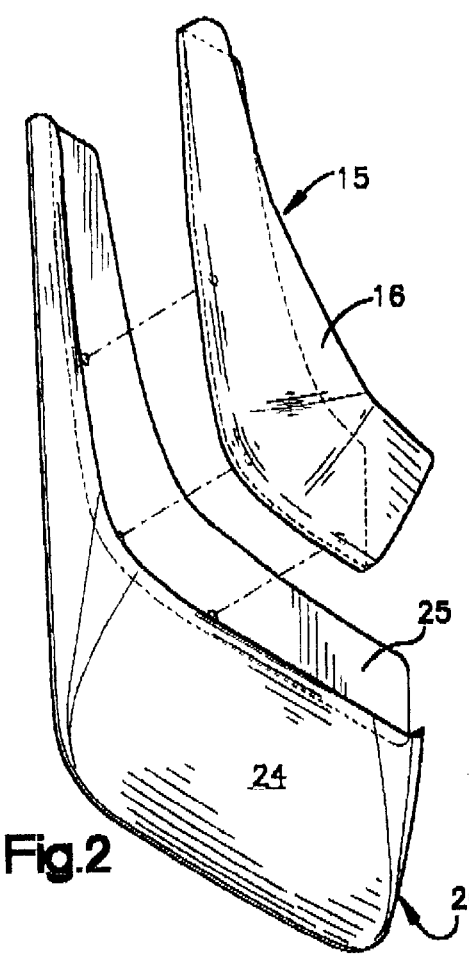
FIG. 2 is an exploded view of a standard component and a customized member of the present invention.
Figure 3:
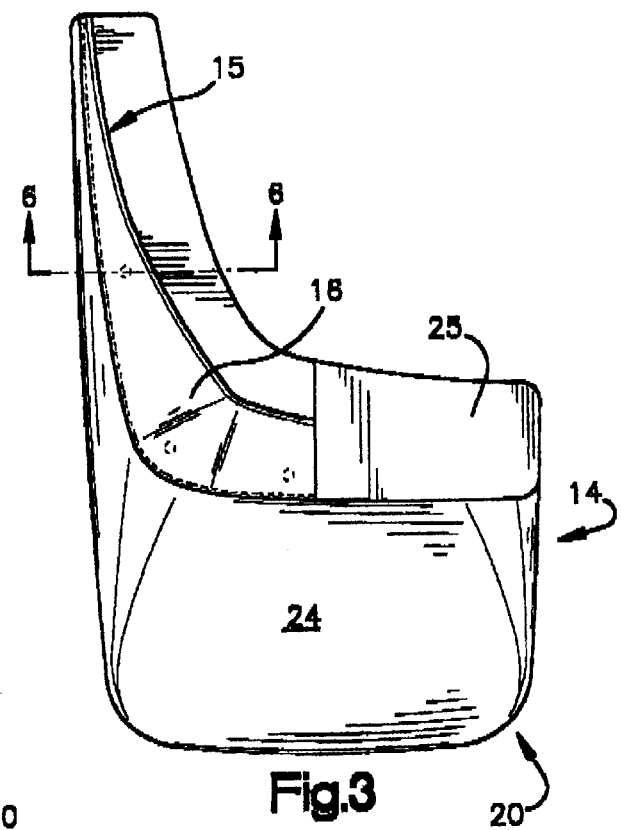
FIG. 3 is a plan view of a splash guard made from the component and member of FIG. 2 in an assembled condition.

Referring to the drawings of FIG. 1 in particular, an automotive wheel and a fragmentary section of a wheel well are shown respectively at 10 and 12. A splash guard of the present invention 14 is mounted on the vehicle. The splash guard 14 includes a customized member 15 which includes a flange portion 16. The flange portion is customized to fit the contours of a specific vehicle such that it fittingly engages a body panel 18 rearwardly of the wheel well 12.

The splash guard 14 also includes a standard component 20. The standard component 20 has a substantially planar forward surface 22 which is oriented forwardly of the vehicle when in use to receive debris thrown up by the wheel 10.

The standard component has a depending lower portion 24 which extends downwardly from the wheel well 12 to protect the vehicle from debris thrown up by the wheel. The planar surface 22 extends throughout the lower portion 24 to the bottom of the splash guard.

The rearward surface of the lower portion 24 is contoured to provide an attractive surface which may carry decorative indicia such as a vehicle trademark which may be applied by conventional hot stamping. Thus, while the standard component may be used in splash guards for vehicles of a number of manufacturers, it can be customized to an extent by hot stamping or otherwise applying such indicia.

The rearward surface of the standard component 20 includes a flat mounting surface 25 which extends upwardly from the lower portion 24. The outer and lower perimeter of the mounting surface 25 is delineated by a member engagement surface 26 defined by a rearward projection or shoulder portion 28.

The customized members 15 each include a flat mounting surface 30 which engages the component mounting surface 25 when a splash guard is assembled, FIG. 6. The custom members also each include a component engagement surface 32 shaped complementally with the member engagement surface 26, FIG. 6. The mounting surfaces 25,30 and the engagement surfaces 26,32 function to relatively locate a standard component and a customized member when a finished splash guard is assembled. Once assembled and secured together as by rivets 34, FIG. 6, a finished splash guard is produced which gives the appearance of being a unitary custom molded splash guard. When an assembled splash guard is mounted in a wheel well 12, a rearward surface 36 of a customized member engages an in turned vehicle flange 38 to which the splash guard is secured.

Figure 4:
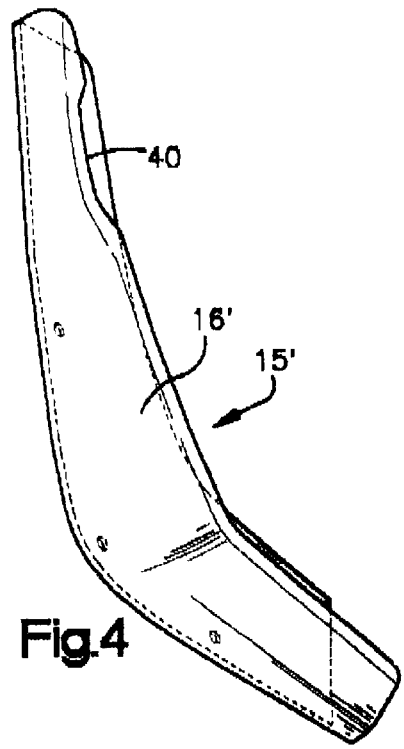
FIGS. 4 and 5 are elevational views of other customized members configured to be connected to the standard component of FIG. 2; and, FIG. 6 is an enlarged sectional view of the assembled splash guard of FIG. 3 as seen from the plane indicated by the line 6—6 of FIG. 3.
Figure 5:
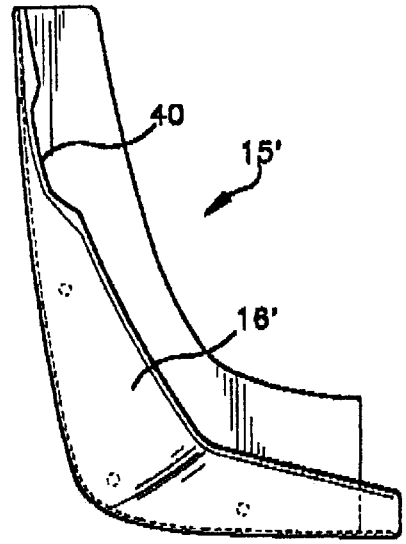

While the standard components 20 are configured to fit a wide range of vehicles, the customized members 15 are not. Rather, while the customized members each include identical mounting and member engagement surfaces 30,32, the flange portions 16 are each customized to fit either a single vehicle, or indeed a single vehicle panel for a specifically customized splash guard or alternately are contoured to fit any vehicle of a group having similar panels akin to the teachings of the Ward et al. patents. FIGS. 4 and 5 are illustrative in that the customized member 15' has a panel engagement flange portion which includes a cutout 40 while the customized member 15 does not. The cutout 40 is sized to precisely fit around a decorate and/or protective molding.

One of the major advantages of the referenced Ward et al. patents was that it was possible for an after market retailer to stock of the order of three sizes of splash guards to fit all then current models of automobiles produced by the so called Big Three U.S. auto companies, as well as a number of models of other manufacturers. With splash guards of the present invention a similar small number of stock keeping units are all that is required to meet a similar range of vehicle body styles and shapes.

After market selling of each splash guard in two pieces to be connected together by the purchaser on installation offers a further advantage. The customized members are molded from materials which will accept and retain a finish coating selected to match the color of a vehicle on which they are to be mounted. Thus, an after market purchaser may paint the customized member and after the paint has cured, connect the standard component to the painted customized member as the two are mounted on the vehicle. Thermoplastic olefin and thermoplastic rubber are the preferred materials for the customized members and they are materials to which a finish coating will adhere.

For OEM manufacturers, the customized members may be pigmented or coated for color coordination with the vehicles to which they are to be attached. Optionally, if the color customized members are not attached to a standard component prior to shipment to the automotive manufacturer, that manufacturer can further reduce its inventory of completed splash guards.

Thus, in providing a customized splash guard for an automobile in accordance with the present invention, one selects the body panel engagement member from a group of members with a selected member being contoured to fit the panel of the automobile to which a splash guard is to be mounted and thereafter relatively locating the member and a standardized mounting component, securing the two together and mounting the two on the vehicle.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What is claimed is:

1. A process of providing a customized splash guard for an automobile comprising:
    a) selecting a body panel engagement member contoured to fit a panel of such automobile from a plurality of engagement members of a variety of contours and having uniform mounting portions; and,
    b) connecting the mounting portion of the selected member to a mounting component having a receiving portion shaped to receive and relatively locate any one of the mounting portions of the members.

2. The process of claim 1, further including the steps of selecting a member coating material matching the color of such panel and applying the selected material to the selected member.

3. The process of claim 1, wherein the selected member and the component are fixed together prior to mounting on such automobile.

4. The process of claim 1, wherein the selected member and the component are fixed together as they are mounted on such automobile.

5. An automotive vehicle splash guard comprising:
    a) a generally flat and flexible mounting component contoured to be mounted in a wheel well of any vehicle of a class of vehicles;
    b) the component including a mounting recess;
    c) a contoured member shaped to provide body panel engagement with at least one selected vehicle but not all vehicles of the class;
    d) the member having a component engaging portion contoured complementally with the recess and sized to fit in the recess such that when the member and the component are secured together with the portion in the recess the member and the component together give the appearance of a unitary splash guard custom molded to fit such at least one selected vehicle of the class; and e) each of the component and the member including surfaces contoured to engage surfaces of a vehicle of the class when mounted on such a vehicle of the class.

6. The splash guard of claim 5, wherein said member is formed from a material coatable with an automotive finish and compatible with the finish to retain that finish over the life of the splash guard whereby the member may be colored to match the color of such at least one selected vehicle.

7. A process of providing custom contoured splash guards for a group of vehicles having differing wheel well and adjacent panel contours comprising:

a) determining the well and adjacent panel contours of vehicles of the group;

b) selecting a contoured panel engagement member shaped to fit a first vehicle, the selection being from a group of members having differing panel engagement portions and identical mounting portions each contoured to fit a mounting portion of a standard mounting component; and, c) securing the mounting portion of the selected member to the mounting portion of the mounting component with the mounting portions being complementally contoured and matched such that when secured together the member and the component provide the appearance of a splash guard custom molded for the selected vehicle.

8. The process of claim 7, further including the steps of selecting a member coating material matching the color of such panel and applying the selected material to the selected member.

9. The process of claim 7, wherein the selected member and the component are fixed together prior to mounting on such automobile.

10. The process of claim 7, wherein the selected member and the component are fixed together as they are mounted on such automobile.

11. An automotive vehicle splash guard comprising:

a) a generally flat and flexible mounting component contoured to be mounted in a wheel well of any vehicle of a class of vehicles;

b) a contoured member shaped to provide body panel engagement with at least one selected vehicle but not all vehicles of the class;

c) the component including a mounting portion configured to relatively locate the member;

d) the member having a component engaging portion contoured complementally with the mounting portion and sized to fit the mounting portion such that when the member and the component are secured together with the portions complementally registered, the member and the component together give the appearance of a unitary splash guard custom molded to fit such at least one selected vehicle of the class; and e) each of the component and the member including surfaces contoured to engage surfaces of a vehicle of the class when mounted on such a vehicle of the class.

12. The splash guard of claim 11, wherein said member is formed from a material coatable with an automotive finish and compatible with the finish to retain that finish over the life of the splash guard whereby the member may be colored to match the color of such at least one selected vehicle.

13. The splash guard of claim 11, wherein the mounting portion includes a recess.

* * * * *